(12) United States Patent
Kaneko

(10) Patent No.: US 6,390,513 B1
(45) Date of Patent: May 21, 2002

(54) COLLAPSIBLE SPACER PIPE

(75) Inventor: Yutaka Kaneko, Arlington Heights, IL (US)

(73) Assignee: Tetra Laval Holdings & Finance, SA, Pully (CH)

( * ) Notice: Subject to any disclaimer, the term of this patent is extended or adjusted under 35 U.S.C. 154(b) by 0 days.

(21) Appl. No.: 09/411,886

(22) Filed: Oct. 4, 1999

(51) Int. Cl.[7] ............................................. F16L 23/00
(52) U.S. Cl. ..................... 285/410; 285/55; 285/339; 285/367
(58) Field of Search .................. 285/55, 420, 409, 285/410, 339, 367

(56) References Cited

U.S. PATENT DOCUMENTS

| | | | |
|---|---|---|---|
| 4,659,118 A | * 4/1987 | Schwyter et al. | 285/55 |
| 4,812,285 A | * 3/1989 | Stapleton | 285/367 |
| 4,885,122 A | * 12/1989 | Stapleton | 285/367 |
| 5,488,812 A | 2/1996 | Stark et al. | |
| 5,586,576 A | * 12/1996 | Franke et al. | 137/559 |
| 5,992,455 A | * 11/1999 | Koller et al. | 137/606 |
| 6,164,708 A | * 12/2000 | Lin | 285/410 |

* cited by examiner

Primary Examiner—Lynne H. Browne
Assistant Examiner—Aaron Dunwoody
(74) Attorney, Agent, or Firm—Welsh & Katz, Ltd.

(57) ABSTRACT

A collapsible spacer pipe is for use between associated equipment items in generally opposing facing relation. The spacer pipe includes a flexible seal element having a main body and a pair of flange seals disposed at ends of the main body. The flange seals extend generally transverse to the main body and are configured to engage inwardly facing flanges of the associated equipment items. A pair of ferrules are configured to engage and cooperate with a respective one of the flange seals to compress the flange seal against the flange of its respective associated equipment item. The ferrules each have a locking leg for abutting and engaging the flange seal and a wedge portion in opposing relation to the locking leg. The wedge portions of the ferrules are in generally facing relation to one another when the ferrules are in place on the seal element. A tapered clamp is disposed between the ferrules and is configured to engage the ferrule wedge portions as it is tightened to urge the ferrules outwardly to compress the flange seals against their respective equipment item flanges.

30 Claims, 3 Drawing Sheets

COLLAPSIBLE SPACER PIPE

FIELD OF THE INVENTION

This invention pertains to a spacer pipe for use between fixed components in a fluid handling system. More particularly, this invention pertains to a collapsible, removable spacer pipe for interconnecting fixed components within a fluid handling system.

BACKGROUND OF THE INVENTION

Piping or pipe sections are typically used to interconnect equipment in fluid transport systems. For example, in a liquid food packaging system, a product tank may be used to store a liquid product that is routed through a plurality of valves through a filling nozzle and into a container such as a gable top carton. In order to dispense a precise amount of the liquid food into the package, the packaging system or packaging machine includes a plurality of valves and pumps for transporting the liquid food from the tank to the container.

In a typical system, the tanks and valves are fixedly mounted to a frame and are interconnected to one another by piping sections. Generally, the piping sections are clamped to the equipment items (and may also be clamped to other piping sections) in order to maintain a liquid tight, sterile fluid path environment.

For ease of maintenance, cleaning, inspection or repair, the piping sections are connected to one another and to the equipment items in a releasable manner. That is, the piping sections can be removed in order to obtain access to the interior surfaces of the piping sections and the equipment items. This is necessary to maintain the high standards and levels of maintenance and care necessary for proper operation of the equipment and processing of the food items.

It will be recognized that this type of arrangement, which requires high levels of cleanliness and care, can be employed in numerous industries other than the food packaging industry. For example, such standards and levels of care may be seen in industries related to microchip processing and manufacture and the like.

In a typical application for use between, for example, a product storage tank and a processing valve, the storage tank outlet nozzle and the pump inlet nozzle each include a flange circumferentially disposed about the end of the inlet or outlet nozzle. The valve is spaced from the tank, thus creating a gap or space between the equipment items. A spacer pipe is inserted between the pump and the tank. The spacer pipe generally also has flanges disposed at either end to mate with the flanges of the equipment items, and clamps are disposed around each of the sets of flanges to maintain a liquid tight fluid seal between the spacer pipe and each of the equipment items.

Often, gaskets or other seals are inserted at about the flange faces that abut one another to maintain this liquid tight seal. More often, in order to maintain a good liquid tight seal the spacing between the equipment items is such that either a force has to be applied to separate the equipment items or one of the equipment items must be moved in order to position the spacer pipe therebetween. As will be recognized, this can greatly increase the time and labor necessary for performing maintenance, cleaning or repair of the system.

Accordingly, there exists a need for a spacer pipe that facilitates maintaining the rigorous sanitary and cleanliness standards necessary for processing systems such as food packaging systems. Desirably, such a spacer pipe is collapsible and is inserted into or removed from between equipment items with minimal or no adjustment necessary to the spacing of the equipment items from one another. Most desirably, such a spacer pipe is readily installed and removed from the system to provide increased flexibility and to facilitate carrying out maintenance, cleaning or repair of the system.

SUMMARY OF THE INVENTION

A collapsible spacer pipe for use between associated equipment items establishes a liquid tight fluid path between the equipment items. The equipment items are in generally opposing facing relation to one another and are formed with flanges facing inwardly or facing one another.

The spacer pipe includes a flexible seal element or diaphragm having a main body and a pair of flange seals disposed at ends of the main body. The flange seals extend generally transverse to the main body and are configured to engage the inwardly facing flanges of the associated equipment items.

A pair of ferrules are configured such that each ferrule engages and cooperates with a respective one of the flange seals to compress the flange seals against the flanges of their respective associated equipment items. The ferrules each have a locking leg for abutting and engaging the flange seal and a wedge portion in opposing relation to the locking leg. The wedge portions of the ferrules are in generally facing relation to one another when the ferrules are in place on the seal element.

A tapered clamp is disposed between the ferrules and is configured to engage the ferrule wedge portions as it is tightened. The clamp includes a pair of blocking surfaces that engage and urge the ferrules outwardly to compress the flange seals against their respective equipment item flanges to effect a liquid tight seal between the spacer pipe and the associated adjacent equipment items.

Advantageously, a collapsible spacer pipe in accordance with the principles of the present invention reduces or eliminates the time necessary to remove and replace otherwise known spacer pipes by eliminating the leveraging or "jacking-up" of the associated equipment items. The spacer pipe of the present invention uses a flexible seal element that can be collapsed onto itself or compressed so that it can be readily inserted between and removed from the associated equipment items and/or piping sections.

In one embodiment, the ferrule wedge portions are formed as legs that extend generally transverse to the locking leg. Preferably, the locking legs have a groove formed therein and the flange seals include a circumferential projection such as a bead for engaging the groove.

The tapered clamp can include a pair of blocking surfaces for engaging the ferrule wedge portions. Preferably, the blocking surfaces are formed at an angle and the ferrule wedge portions are formed at an angle that is complementary to the blocking surface angles.

In an alternate embodiment, the ferrule locking leg and wedge portion are formed on opposing faces of the ferrule. A rigid element such as a sleeve can be disposed extending circumferentially about the seal element main body portion and the ferrules can be disposed over the rigid element when the ferrules are in engagement with the flange seals.

In yet another alternate embodiment, seals such as o-rings are positioned between the tapered clamp blocking surfaces and the wedge portions of the ferrules. Such an arrangement can be used in systems that are subjected to less than atmospheric pressure, e.g., vacuum systems.

Other features and advantages of the present invention will be apparent from the following detailed description, the accompanying drawings, and the appended claims.

DETAILED DESCRIPTION OF THE PREFERRED EMBODIMENTS

Figure 1:
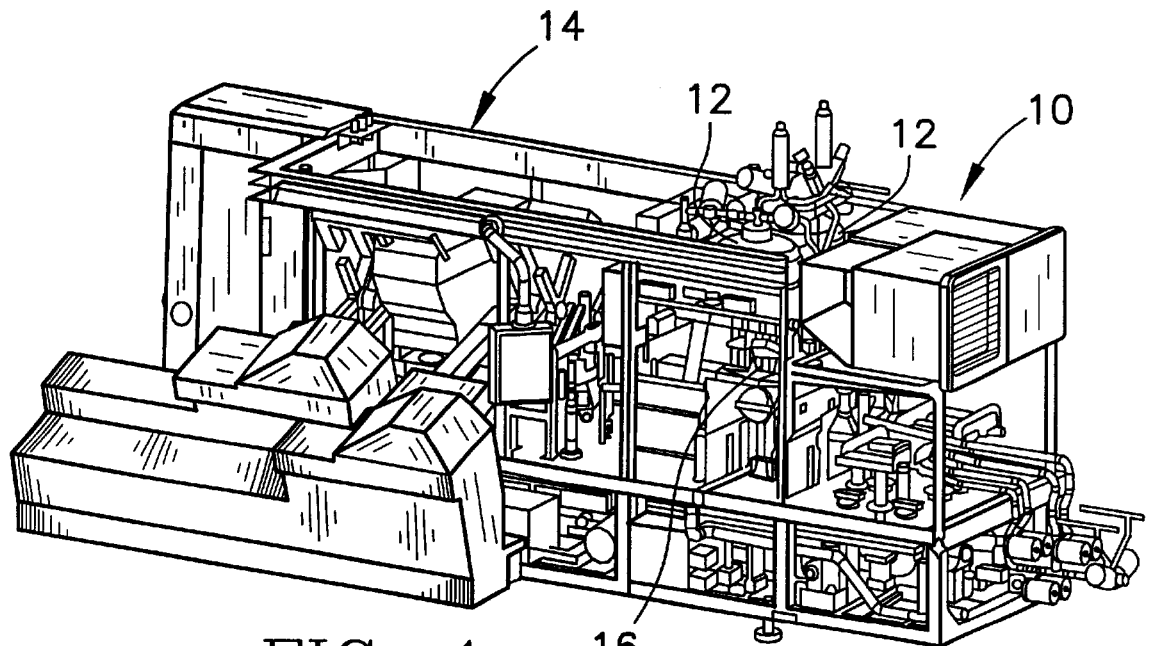
FIG. 1 is a perspective view of an exemplary liquid food packaging machine that includes one or more collapsible spacer pipes embodying the principles of the present invention.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Figure 2:
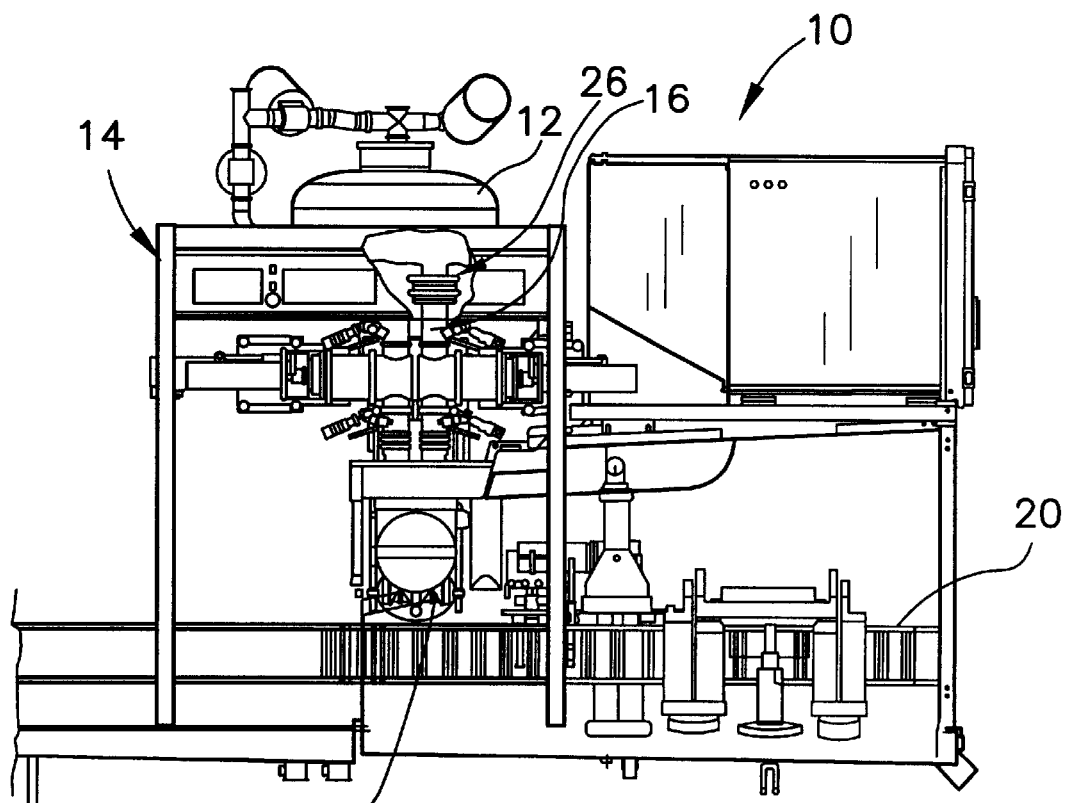
FIG. 2 is a side view of a portion of the machine of FIG. 1 with a portion of the machine facing removed for illustrative purposes.

Referring now to the figures and in particular FIGS. 1 and 2, there is shown an exemplary liquid food packaging machine 10. The exemplary packaging machine 10 includes one or more product tanks 12 supported by a frame 14 and at least one product discharge valve 16 associated with each tank 12. A nozzle 18 is positioned generally below the valve 16 through which the product is dispensed into one of a plurality of containers (not shown) positioned on and moving along a conveyor 20. An exemplary liquid packaging machine is disclosed in U.S. Pat. No. 5,488,812, to Stark, et al., which patent is commonly assigned herewith and is incorporated herein by reference.

As will be readily apparent from the figures, there are a plurality of connections extending between the various equipment items, e.g. between the product tank 12 and an associated valve 16, which connections necessarily maintain a sealed liquid flow path for the food product. In one known configuration, the interconnections are made using steel spacers having gaskets disposed at the faces of flanges that interface with the various equipment items. In order to remove one of these spacers to, for example, perform maintenance on the equipment, it is often necessary to loosen the mounting or supports for the equipment item, e.g., the product tank, and leverage or jack the tank upwardly, away from its connected equipment in order to remove the gaskets and spacers. The spacers are maintained connected to the various equipment items by a plurality of clamps, such as dairy clamps, which will be recognized by those skilled in the art.

It has been observed that the time and labor required to loosen these equipment items can greatly increase the cost associated with maintaining, cleaning, repairing or inspecting the equipment. In addition to the time and thus cost needed to remove the spacers, after maintenance is performed, the equipment must be reconnected and properly aligned to assure proper operation of the packaging system. This too adds time and cost to overall equipment maintenance.

Figure 3:
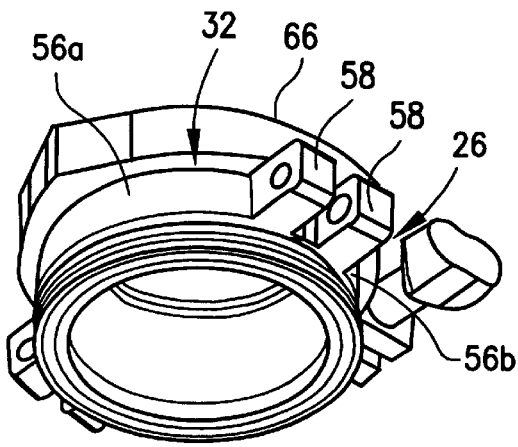
FIG. 3 is a perspective view of one embodiment of the collapsible spacer pipe in accordance with the principles of the present invention, the spacer pipe being illustrated with one clamp for clamping the spacer pipe to an adjacent equipment item, and with the clamp to the opposing equipment item removed for clarity of illustration.
Figure 4:
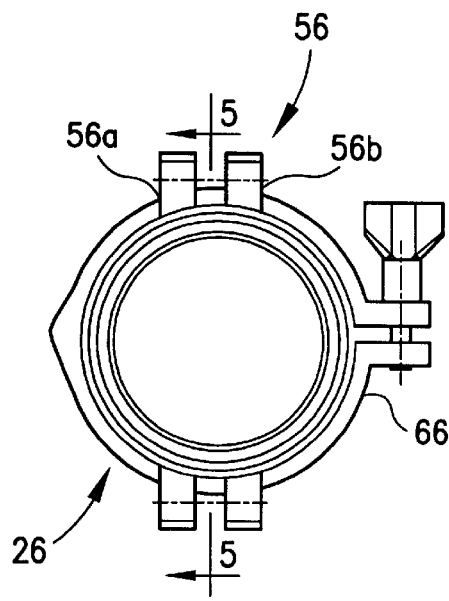
FIG. 4 is a bottom view of the spacer pipe of FIG. 3.
Figure 5:
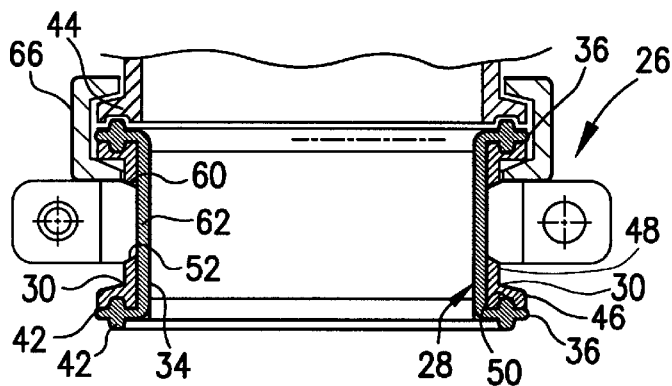
FIG. 5 is a cross-sectional view of the spacer pipe of FIG. 4 taken along line 5—5 of FIG. 4, the spacer pipe being shown in the general orientation as shown in FIG. 3 for ease of illustration.

Referring to FIGS. 3–5, one embodiment 26 of a collapsible spacer pipe in accordance with the principles of the present invention is shown which reduces or eliminates the time necessary to remove and replace the spacer pipe by eliminating the leveraging or "jacking-up" of the equipment. The collapsible spacer pipe 26 includes, generally, a rubber diaphragm or seal 28, a pair of ferrule-like flanges 30 and a tapered clamp 32.

Figure 6:
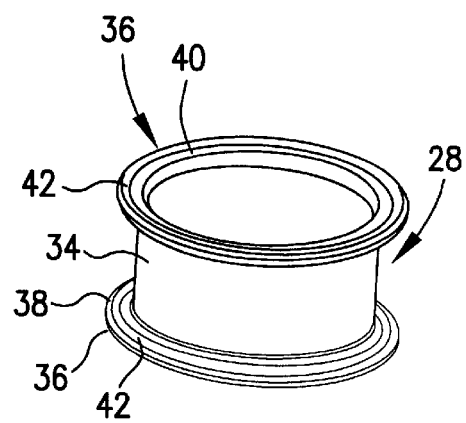
FIG. 6 is a perspective view of the spacer pipe diaphragm.

As best seen in FIG. 6, the rubber diaphragm 28 includes a substantially cylindrical main body portion 34. At either end of the cylindrical main body 34, the diaphragm 28 includes a flange seal 36 that extends radially outwardly, generally transverse to the main body 34. The flange seals 36 extend outwardly to provide a region for clamping the diaphragm 28 in place and to effect a liquid tight seal for the fluid flow path. In a preferred embodiment, each flange seal 36 includes an inner face 38 and an outer face 40, and each face 38, 40 includes a circumferential projection, such as the illustrated bead 42 or other type of sealing and/or aligning element extending from the face 38, 40. The diaphragm 28 is formed from a food grade rubber, such as EPDM, or the like and is thus flexible so that it can be collapsed onto itself or compressed for ready insertion into or removal from a given space between components, e.g., the space between the tank 12 and the valve 16.

Figure 7:
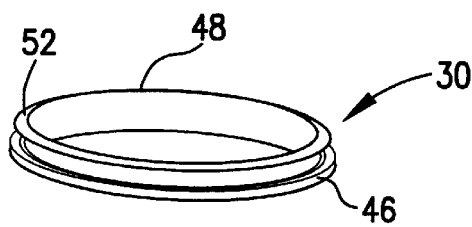
FIG. 7 is a perspective view of the spacer pipe ferrule.

Referring now to FIGS. 5–7, the ferrules 30 are configured for mating with the diaphragm flange seals 36 to secure the flange seals 36 to mating flanges on adjacent equipment items or piping sections, such as the exemplary tank flanges 44 illustrated in FIG. 5. A ferrule 30 is associated with each of the diaphragm flange seals 36. In one embodiment, the ferrule 30 has a generally L-shaped body including a first locking leg 46 that extends generally parallel to the diaphragm flange seal 36 and a wedge leg 48 that extends transverse to the locking leg 46.

Preferably, the locking leg 46 includes a groove 50 formed therein that is configured to mate with the bead 42 formed on the diaphragm flange seal 36. In this manner, when the ferrule 30 is engaged with the diaphragm flange seal 36 and tightened thereagainst, the flange seal 36 effects a liquid tight seal between the collapsible spacer pipe 26 and the mating equipment flange 44, and the bead/groove 42/50 configuration maintains the flange seal 36 properly positioned against or seated on the adjacent equipment item flange 44. In a most preferred embodiment, the wedge leg 48 includes a tapered surface, illustrated at 52, that, in conjunction with the tapered clamp 32, as will be discussed below, enhances the seal formed at either end of the diaphragm 28.

Figure 8:
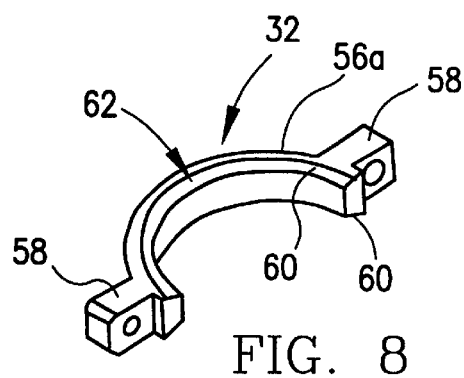
FIG. 8 is a perspective view of one-half of the spacer pipe tapered clamp.

The tapered clamp 32, an exemplary one-half of which is best seen in FIG. 8, is defined by a main body portion 56 having a split-ring configuration, as indicated at 56a,b in FIG. 3. The split rings 56a,b essentially define a circumferential clamping element. Bolt blocks 58 extends from each of the split ring halves 56a,b to secure the ring halves 56a,b to one another. The ring halves 56a,b are secured to one another using bolts (not shown) or other appropriate fasteners.

The clamp 32 is formed with a pair of blocking surfaces 60 each having an incline or taper (i.e., an angled surface as indicated at 62) that is complementary to, and is configured to mate with, the tapered surface 52 of its respective ferrule wedge legs 48. When the collapsible spacer pipe 26 is positioned between equipment items or between an equipment item and a rigid piping section, the ferrules 30 are positioned to engage the diaphragm flange seals 36, with the tapered surfaces 52 of the ferrule wedge legs 48 in a facing position relative to one another.

A gap is defined between the tapered surfaces 52, and the clamp 32 is positioned in the gap between the ferrules 30. The blocking surfaces 60 engage the ferrule tapered surfaces 52 and, as the clamp 32 is tightened, it urges the ferrules 30 outwardly into engagement with, i.e., compressing against, the diaphragm flange seals 36. This outward urging forms a seal between the diaphragm flange seals 36 and their respective adjacent equipment flanges, e.g. 44. To this end, the collapsible spacer pipe 26 provides a readily removable and installable connection between adjacent, fixed piping system sections or equipment items and effects a liquid tight connection between the equipment items.

As shown in FIGS. 3 and 5, a dairy clamp 66 or other known clamp can be positioned to engage one of the ferrules 30 and to secure the ferrule 30 to, for example, the product tank nozzle flange 44. It is anticipated that securing one of the ferrules 30 and the diaphragm flange seal 36 to a stationary or fixed equipment item will facilitate ready installation of the opposing ferrule 30 to its respective equipment or piping section flange, with minimal labor required.

To remove the spacer pipe 26, it is only necessary to loosen the dairy clamp 66 (note that dairy clamps 66 may be used at both ferrule/seal flange/flange 30/36/44 interface, in which case, both dairy clamps require removal). Once the dairy clamp or clamps 66 is/are removed, the tapered clamp 32 is removed. The diaphragm 28 can then be collapsed inwardly by compressing the flange seals 36 toward one another, and the spacer pipe 26 removed.

Figure 9:
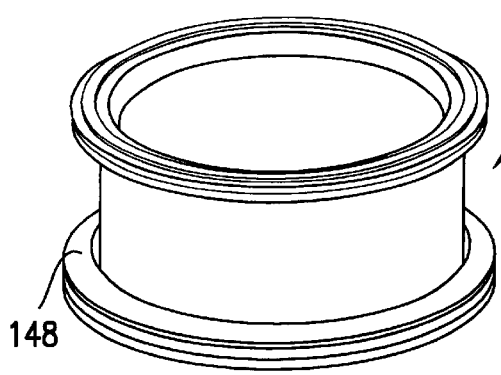
FIG. 9 is a perspective view of an alternate embodiment of the spacer pipe illustrated with the tapered clamp removed for clarity of illustration.
Figure 11:
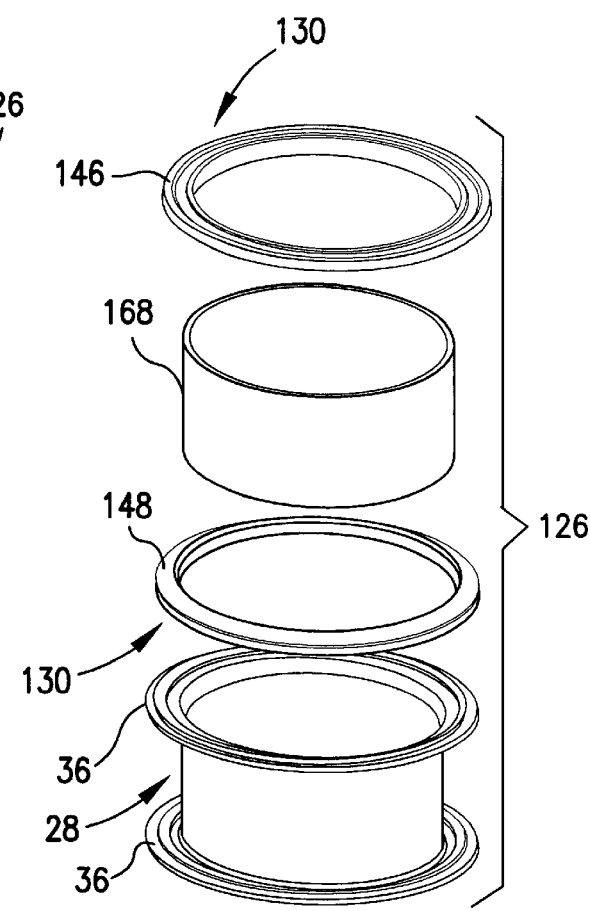
FIG. 11 is an exploded view of the spacer pipe of FIGS. 9 and 10 also shown without the tapered clamp.
Figure 10:
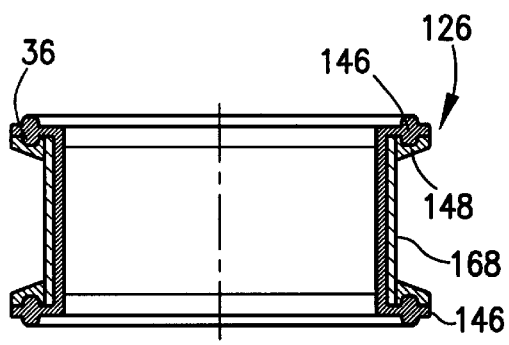
FIG. 10 is a cross-sectional view of the alternate embodiment of the spacer pipe of FIG. 9 illustrated with the tapered clamp removed for clarity of illustration.

An alternate configuration of the collapsible spacer pipe 126 is illustrated in FIGS. 9–11. In this embodiment, the ferrules 130 include wedge surfaces 148 and locking surfaces 146 that are formed in opposing relation to one another about the main body of the ferrule 130.

In this configuration, an optional protective or support portion, such as a sleeve 168 that can be formed from a rigid pipe section, can be positioned around the diaphragm main body 34 and between the ferrules 130 to provide additional, structural support or strength to the connection. In other manners, the alternate embodiment 126 is similar to the embodiment 26 illustrated in FIGS. 3 through 8. That is, a tapered clamp 32 is inserted between the ferrules 130 and is tightened about the diaphragm 28. The blocking surfaces 60 of the clamp 32 engage the ferrule wedge surfaces 148 and urge the ferrules 130 outwardly into engagement with the diaphragm flange seals 36, and, in turn, into engagement with the flanges, e.g., 44 of the adjoining or adjacent equipment items.

It is also contemplated that the present collapsible spacer pipe can include a leak detection system (not shown). In such an arrangement, the ferrules can be formed from a non-metallic material, such as plastic or the like, to provide electrical isolation between the tapered clamp and the other conductive portions of the machine. In this manner leak detection (for leakage of the diaphragm) can be provided by monitoring whether an electrically conductive path has been established between the isolated tapered clamp and the machine by, for example, leaking liquid.

Figure 12:
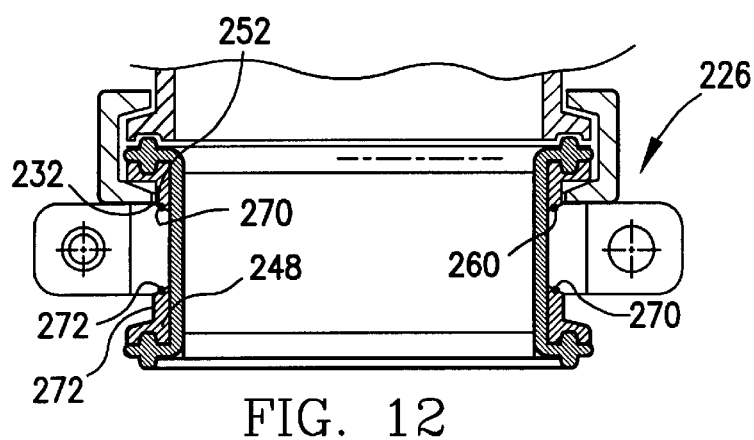
FIG. 12 is a cross-sectional view of still another embodiment of the collapsible spacer pipe shown with O-rings disposed between the ferrules and the tapered clamp.

It is further contemplated that an embodiment of the spacer pipe 226 can be used to provide isolation of a fluid system at less than atmospheric pressure, that is, a system under vacuum. In such an arrangement, as seen in FIG. 12, sealing elements, such as o-rings 270 are positioned between the tapered surfaces 252 of the wedge legs 248 and the blocking surfaces 260 of the tapered clamp 232. The o-rings 270 can be fitted into grooves 272 formed in the clamp 232 blocking surfaces 260 and the ferrule tapered surfaces 252.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A collapsible spacer pipe for use between associated equipment items for establishing a liquid tight fluid path between the associated equipment items, the associated equipment items being in generally opposing facing relation to one another and being formed with inwardly facing flanges thereon, the spacer pipe comprising:

a flexible seal element having a main body and a pair of flange seals disposed at ends of the main body, the flange seals extending generally transverse to the main body and configured to engage the inwardly facing flanges of the associated equipment items;

a pair of ferrules, each ferrule configured to engage and cooperate with one of the flange seals to compress the flange seal against its respective associated equipment item flange, the ferrules each having a locking leg for abutting and engaging the flange seal and a wedge portion in opposing relation to the locking leg, the wedge portions of the ferrules being in generally facing relation to one another when the ferrules are in place on the seal element; and a tapered clamp disposed between the ferrules, the tapered clamp configured to engage the ferrule wedge portions as it is tightened and to urge the ferrules outwardly to compress the flange seals against their associated respective equipment item flanges.

2. The collapsible spacer pipe in accordance with claim 1 wherein the ferrule wedge portion is formed as a leg extending generally transverse to the locking leg.

3. The collapsible spacer pipe in accordance with claim 1 wherein the locking leg has a groove formed therein and wherein the flange seal includes a circumferential projection for engaging the groove.

4. The collapsible spacer pipe in accordance with claim 3 wherein the circumferential projection is formed as a bead.

5. The collapsible spacer pipe in accordance with claim 1 wherein the tapered clamp includes a pair of blocking surfaces for engaging the ferrule wedge portions.

6. The collapsible spacer pipe in accordance with claim 5 wherein the tapered clamp blocking surfaces are formed at an angle and wherein the ferrule wedge portions are formed at an angle that is complementary to the clamping surface angles.

7. The collapsible spacer pipe in accordance with claim 2 wherein the ferrule has a generally L-shaped body.

8. The collapsible spacer pipe in accordance with claim 7 wherein the locking leg is formed on a side of the L-shaped body and the wedge portion is formed on another side of the L-shaped body.

9. The collapsible spacer pipe in accordance with claim 1 wherein the ferrule locking leg and wedge portion are formed on opposing faces of the ferrule.

10. The collapsible spacer pipe in accordance with claim 1 including a rigid element extending circumferentially about the seal element main body portion.

11. The collapsible spacer pipe in accordance with claim 10 wherein the ferrules are disposed over the rigid element when the ferrules are in engagement with the flange seals.

12. The collapsible spacer pipe in accordance with claim 1 including a sealing element disposed between the tapered clamp and at least one of the ferrule wedge portions.

13. The collapsible spacer pipe in accordance with claim 12 wherein the sealing element is an o-ring.

14. The collapsible spacer pipe in accordance with claim 12 wherein the sealing element is disposed in a groove formed in the tapered clamp and the at least one of the ferrule wedge portions.

15. A collapsible spacer pipe for use between associated equipment items for establishing a liquid tight fluid path between the associated equipment items, the associated equipment items being in generally opposing facing relation to one another and being formed with inwardly facing flanges thereon, the spacer pipe comprising:

a flexible diaphragm having a main body and a pair of flange seals disposed at ends of the main body, the flange seals extending generally transverse to the main body and configured to engage the associated equipment item inwardly facing flange, the seal flanges each having inner and outer faces having a bead formed thereon extending therefrom;

a pair of ferrules, each ferrule having a generally L-shaped body and configured to engage and cooperate with one of the flange seals to compress the flange seal against its respective associated equipment item flange, the ferrules each having a locking leg for abutting and engaging the flange seal and a wedge portion in opposing relation to the locking leg, the locking legs each having a groove formed therein for receiving the bead from its respective seal flange, the wedge portions being angled and in generally facing relation to one another when the ferrules are in place on the diaphragm; and a tapered clamp disposed between the ferrules, the tapered clamp having a pair of angled blocking surfaces configured to engage the ferrule wedge portions as it is tightened about the diaphragm to urge the ferrules outwardly to compress the flange seals against their respective associated equipment item flanges.

16. The collapsible spacer pipe in accordance with claim 15 wherein the angle at which the tapered clamp blocking surfaces are formed and the angle at which the ferrule wedge portions are formed are complementary.

17. The collapsible spacer pipe in accordance with claim 15 wherein the tapered clamp and the ferrule wedge portions each include a groove formed therein, and including a sealing element disposed between the tapered clamp and the ferrule wedge portions in the grooves formed therein.

18. The collapsible spacer pipe in accordance with claim 17 wherein the sealing element is an o-ring.

19. A collapsible spacer pipe for use between associated equipment items for establishing a liquid tight fluid path between the associated equipment items, the associated equipment items being in generally opposing facing relation to one another and being formed with inwardly facing flanges thereon, the spacer pipe comprising:

a flexible diaphragm having a main body and a pair of flange seals disposed at ends of the main body, the flange seals extending generally transverse to the main body and configured to engage the associated equipment item inwardly facing flange, the seal flanges each having inner and outer faces having a bead formed thereon extending therefrom;

a pair of ferrules, each configured to engage and cooperate with one of the flange seals to compress the flange seal against its respective associated equipment item flange, the ferrules each having a locking surface for abutting and engaging the flange seal and a wedge surface in opposing relation to the locking surface, the wedge surfaces being angled and in generally facing relation to one another when the ferrules are in place on the diaphragm; and a tapered clamp disposed between the ferrules, the tapered clamp having a pair of angled blocking surfaces configured to engage the ferrule wedge surfaces as it is tightened about the diaphragm to urge the ferrules outwardly to compress the flange seals against their respective associated equipment item flanges.

20. The collapsible spacer pipe in accordance with claim 19 including a rigid element extending circumferentially about the seal element main body portion.

21. The collapsible spacer pipe in accordance with claim 20 wherein the ferrules are disposed over the rigid element when the ferrules are in engagement with the flange seals.

22. A collapsible spacer pipe for use between associated equipment items for establishing a liquid tight fluid path between the associated equipment items, the associated equipment items being in generally opposing facing relation to one another and being formed with inwardly facing flanges thereon, the spacer pipe comprising:

a flexible seal element having a main body and a pair of flange seals disposed at ends of the main body, the flange seals extending generally transverse to the main body and configured to engage the inwardly facing flanges of the associated equipment items;

a pair of ferrules, each ferrule configured to engage and cooperate with one of the flange seals to compress the flange seal against its respective associated equipment item flange, the ferrules configured to abut and engage the flange seal, each ferrule having a wedge portion wherein the wedge portions of the ferrules are in generally facing relation to one another when the ferrules are in place on the seal element; and a clamp disposed between the ferrules configured to urge the ferrules outwardly to compress the flange seals against their respective associated equipment item flanges.

23. The collapsible spacer pipe in accordance with claim 22 wherein the ferrules each have a locking leg configured for engagement by its respective ferrule wedge portion.

24. The collapsible spacer pipe in accordance with claim 23 wherein the ferrule wedge portion is formed as a leg extending generally transverse to the locking leg.

25. The collapsible spacer pipe in accordance with claim 23 wherein the locking leg has a groove formed therein and wherein the flange seal includes a circumferential projection for engaging the groove.

26. The collapsible spacer pipe in accordance with claim 25 wherein the circumferential projection is formed as a bead.

27. The collapsible spacer pipe in accordance with claim 22 wherein the clamp is tapered.

28. The collapsible spacer pipe in accordance with claim 27 wherein the clamp taper is formed at an angle and wherein the ferrule wedge portions are formed at an angle that is complementary to the clamp tape.

29. The collapsible spacer pipe in accordance with claim 23 wherein the ferrule locking leg and wedge portion are formed on opposing faces of the ferrule.

30. The collapsible spacer pipe in accordance with claim 23 including a rigid element extending circumferentially about the seal element main body portion.

\* \* \* \* \*